J. W. Fawkes.
Steam Plow.
No. 855.
Reissued Nov. 22, 1859.
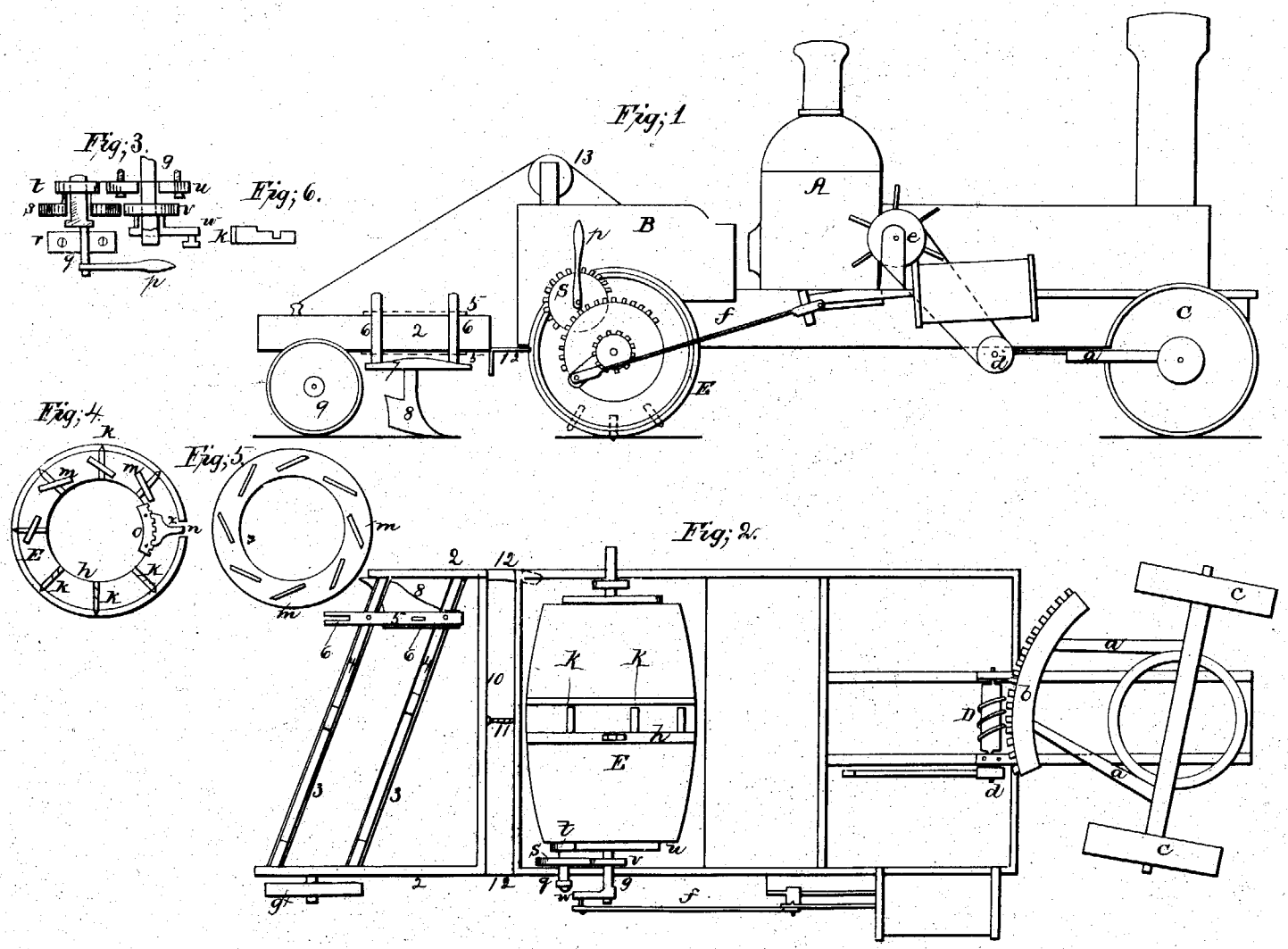

UNITED STATES PATENT OFFICE.

JOSEPH W. FAWKES, OF CHRISTIANA, PENNSYLVANIA.

IMPROVEMENT IN MACHINES FOR PLOWING.

Specification forming part of Letters Patent No. 19,189, dated January 26, 1858; Reissue No. 855, dated November 22, 1859.

*To all whom it may concern:*

Be it known that I, JOSEPH W. FAWKES, of Christiana, in the county of Lancaster and State of Pennsylvania, have invented a new and useful Improvement in Locomotive or Steam Plows; and I do hereby declare that the following is a full, clear, and exact description of the same, reference being had to the annexed drawings, making a part of this specification, in which—

Figure 1 is a side view. Fig. 2 is a top view, exhibiting the form of the driving-roller or main wheel and the device for guiding the front wheels. Fig. 3 is a section showing the gear connecting the main wheel and crank-shaft. Figs. 4 and 5 are sections showing the device for protruding the spuds of the driving-wheel.

By my improvements in locomotive or steam plows, wherein I employ a large barrel-shaped or bilged driving-wheel for the propulsion of the machine, I avoid the sinking in the earth of the wheels hitherto employed, and am thereby enabled to employ the locomotive in the culture of soft land, or where it is desirable to pass the locomotive over plowed land in harrowing or seeding, &c. This driving-wheel may be furnished with spuds or spears, admitting of being projected or withdrawn and retracted. By this means a greater hold to the wheel on the earth can be given where the land is hard, thus securing the full traction of the machine. In a majority of cases, however, a smooth driving-wheel or roller, constructed as hereinafter described, will be fully competent to propel the machine. The plows are secured in an adjustable frame attached to the rear of the locomotive, so as to admit of plowing and of being readily raised when requisite. In the guidance of the front wheels I employ a windlass and band operating a screw which meshes into cogs of a segmental rack projecting from the rear of the axle of said front wheel.

To enable those skilled in the art to make and use my invention, I will proceed to describe its construction and operation.

A represents the boiler; B, the water-tank placed on the same frame as the boiler and engine; *c c*, the front wheels. *a a* are hounds, on which is secured the segmental rack *b*. The front axle is furnished with a circular plate for giving steadiness of movement.

D is a screw on a shaft, provided with a pulley, *d*, on the end of its axle. *e* is a larger drum or pulley on the frame of the locomotive, being furnished with handles for turning. A band or strap passes around the pulleys, thus moving the screw and the rack attached to the front wheels either to the right or left, while the large barrel-shaped driving-wheel E facilitates the turning of the locomotive.

*f* is the pitman-rod, attached to a loose crank turning on the axle *g* of the main wheel E. This wheel is made up of staves clamped together, with heads of metal, and rods and screw-nuts. It forms a barrel-shaped wheel in which is a diaphragm, *h*, (see Fig. 4,) having suitable grooves for the reception of sliding spuds or spears *k k*. Three of these spuds are shown in the lower part of Fig. 4, and a side view of the spud as enlarged is seen in Fig. 6, with its notch for the reception of a bar, *m*, projecting from the under side of a movable ring. (Shown by Fig. 5.) This figure presents an inverted view of the ring. In Fig. 4 the bars *m m* are shown in their position in the recesses of the spud by supposing the plate-ring to have been removed.

*n* is a pivoted lever moving on a center-pin, *x*. It is formed with cogs which mesh into a segmental rack, O, secured to the diaphragm. When it is requisite to project the spurs or spuds *k*, as in plowing hard earth, the end of the lever *n* is drawn to the side of the recess, thus moving the ring *h* and its bars *m m*, said bars operating upon the spurs and projecting them out or withdrawing them, as the lever is moved to the right or left.

The device for throwing the crank into gear with the main driving-wheel E is thus described.

*p* is a handle, secured on an eccentric shaft, *q*, (see Fig. 3,) which is confined in journal-blocks *r*, attached to the frame of the locomotive. The shaft *q* is enlarged and has upon it the wheel *s* and pinion *t*, attached thereto. This wheel and pinion turn on a sleeve on shaft *q*.

*u* is a wheel, secured by screws to the head of the wheel E, and turning therewith.

V is a pinion, and W a crank, both sleeved and turning freely on the shaft or axle *g* of the main driving-wheel E.

To throw the crank into gear with the wheel E, raise the handle *p*, which will throw the wheels *s* and *t* into mesh with the wheels *u* and V, thus uniting in movement the crank *w* and wheel *u*. When not in gear the crank and wheel V move freely on the axle *g*, the wheels *s* and *t* having been removed from mesh by the dropping of the handle *p*.

One of the advantages gained by the use of the barrel shaped driving-wheel is that of supporting the water-tank and a large portion of the engine upon its broad surface.

The plow-frame consists of side timbers, 2 2, and diagonally-placed cross-girts 3 3. The girts are made with vertical slots 4 4 for the purpose of allowing the bolts confining the plow-beam and its frame to be adjusted to each other.

5 5 are slotted plates, through which the clamping-bolts pass, and through which the uprights 6 6, rising from the plow-beam 7, also pass.

8 is one of the plows, and 9 is a gage-wheel, which admits of being raised or lowered as the frame requires change.

To adjust the plows to their work—say, to give them point—the front standard, 6, is lowered and the rear one is raised. In this way the plows may be made to enter the soil more or less. The relative position they may require to each other can be obtained by moving the plates 5 5, &c., in the slots 4 4. The plows are drawn by a chain attaching their beams to projecting pieces connected with the front cross-piece of the frame. A chain, 11, serves as the draft-line of the plows and their frame, and by means of guides 12 12, entering staples on the under side of the locomotive-frame, the plows are properly guided.

The engine is of the ordinary construction in its arrangement of boiler, cylinder, &c.

By means of a cord and windlass, 13, upon the tank the plow-frame may be raised entirely from the earth.

Having thus described my invention, what I claim as new, and desire to secure by Letters Patent, is—

1. The employment, in combination with the locomotive, of a bilge-shaped driving-wheel, substantially as set forth.

2. I do not claim broadly the invention of movable spurs; but I claim the combination of the sliding spurs *k k* with the bilge-shaped driving-wheel E, as herein shown and described.

3. The arrangement of the adjustable frame, plows, gage-wheel, driving-wheel, engine, boiler, and guiding-wheels, as herein shown and described.

J. W. FAWKES.

Witnesses:
ALFRED ALLEN,
WM. AYRES.